United States Patent
Barkan et al.

(10) Patent No.: US 8,876,004 B2
(45) Date of Patent: Nov. 4, 2014

(54) POINT-OF-TRANSACTION WORKSTATION FOR IMAGING INDICIA OVER FULL COVERAGE SCAN ZONE OCCUPIED BY ASYMMETRICAL LIGHT COLLECTION REGIONS

(75) Inventors: Edward Barkan, Miller Place, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/944,241

(22) Filed: Nov. 11, 2010

(65) Prior Publication Data

US 2012/0118962 A1 May 17, 2012

(51) Int. Cl.
*G06K 7/10* (2006.01)

(52) U.S. Cl.
CPC ................................ *G06K 7/10722* (2013.01)
USPC ............ 235/462.32; 235/462.01; 235/462.14; 235/462.43

(58) Field of Classification Search
USPC ................. 235/375, 383, 435, 439, 440, 454, 235/462.01, 462.08, 462.09, 462.14, 235/462.22, 462.32, 462.41, 462.42, 235/462.43, 470
See application file for complete search history.

(56) References Cited

U.S. PATENT DOCUMENTS

| | | | |
|---|---|---|---|
| 7,191,947 B2 | 3/2007 | Kahn et al. | |
| 7,748,631 B2 * | 7/2010 | Patel et al. | 235/462.14 |
| 7,775,436 B2 * | 8/2010 | Knowles et al. | 235/462.42 |
| 7,780,087 B2 * | 8/2010 | Bobba et al. | 235/462.39 |
| 7,784,695 B2 * | 8/2010 | Knowles et al. | 235/454 |
| 7,878,407 B2 * | 2/2011 | Knowles et al. | 235/462.42 |
| 2006/0022051 A1 * | 2/2006 | Patel et al. | 235/462.14 |
| 2008/0142602 A1 * | 6/2008 | Knowles et al. | 235/462.42 |
| 2009/0188980 A1 * | 7/2009 | Bobba et al. | 235/462.39 |
| 2010/0102129 A1 * | 4/2010 | Drzymala et al. | 235/462.42 |
| 2010/0163622 A1 * | 7/2010 | Olmstead | 235/454 |
| 2010/0163626 A1 | 7/2010 | Olmstead | |
| 2010/0163628 A1 * | 7/2010 | Olmstead | 235/470 |

OTHER PUBLICATIONS

International Search Report and Written Opinion for International Patent Application No. PCT/US2011/056075 mailed on May 22, 2012.

* cited by examiner

*Primary Examiner* — Paultep Savusdiphol
(74) *Attorney, Agent, or Firm* — Nong-Qiang Fan

(57) ABSTRACT

A bi-optical, dual window, point-of-transaction workstation images indicia associated with multi-sided products over a full coverage scan zone by asymmetrically splitting the field of view of at least one imager into light collection regions of different spatial volumes. The light collection regions fill the scan zone and minimize dead areas therein. A smaller light collection region images one side of the product, while a larger light collection region images more than one side of the product. All sides of the product are imaged in the light collection regions. Twisting of the light collection regions relative to at least one of the windows is minimized so that the light collection regions fit fully with minimal clipping through each window. Illumination light is directed away from a user's eyes.

12 Claims, 10 Drawing Sheets

POINT-OF-TRANSACTION WORKSTATION FOR IMAGING INDICIA OVER FULL COVERAGE SCAN ZONE OCCUPIED BY ASYMMETRICAL LIGHT COLLECTION REGIONS

BACKGROUND OF THE INVENTION

It is known to use laser-based and/or imager-based readers in a dual window or bi-optical workstation to electro-optically read indicia, such as bar code symbols, associated with three-dimensional products to be identified and processed, e.g., purchased, at a point-of-transaction workstation provided at a countertop of a checkout stand in supermarkets, warehouse clubs, department stores, and other kinds of retailers. The products are typically slid or moved across, or presented to a central region of, a generally horizontal window that faces upwardly above the countertop and/or a generally vertical or upright window that vertically faces a user at the workstation. When at least one laser scan line generated by a laser-based reader sweeps over a symbol and/or when return light from the symbol is captured over a field of view by a solid-state imager of an imager-based reader, the symbol is then processed, decoded and read, thereby identifying the product.

The symbol may be located low or high, or right to left, on the product, or anywhere in between, on any of six sides of the product. The symbol may be oriented in a "picket fence" orientation in which elongated parallel bars of a one-dimensional Universal Product Code (UPC) symbol are vertical, or in a "ladder" orientation in which the UPC symbol bars are horizontal, or at any orientation angle in between. The products may be held by the user at various tilt angles during their movement across, or presentation to, either window. The products may be positioned either in contact with, or held at a distance away from, either window during such movement or presentation. All these factors make the symbol location variable and difficult to predict in advance.

In such an environment, it is important that the readers at the workstation provide a full coverage scan zone above the horizontal window and in front of the vertical window so that the scan zone extends down as close as possible to the countertop, and sufficiently high above the countertop, and as wide as possible across the width of the countertop. The scan zone projects into space away from the windows and grows in volume rapidly in order to cover symbols on products that are positioned not only on the windows, but also many inches therefrom. The scan zone must be large enough to read symbols positioned in any possible way across the entire volume of the scan zone and must not have any dead areas in which symbols are not covered and, therefore, cannot be read.

As advantageous as workstations with laser-based readers have been in processing transactions, workstations with imager-based readers, also known as imagers, are thought to offer improved reliability and have the added capability of reading indicia other than UPC symbols, such as two-dimensional or stacked or truncated symbols, as well as the capability of imaging non-symbol targets, such as receipts, driver's licenses, signatures, etc. It was initially thought that an all imager-based workstation would require about ten to twelve imagers in order to provide a full coverage scan zone to enable reliable reading of indicia that could be positioned anywhere on all six sides of a three-dimensional product. However, to bring the cost of the imager-based workstation down to an acceptable level, it is known to reduce the need for so many imagers by splitting the field of view of at least one imager into light collection regions.

However, such light collection regions produced by splitting the field of view in the known imager-based workstation do not fully occupy the scan zone. As a result, the scan zone does not have full coverage and has dead areas in which indicia cannot be read. Also, such light collection regions are generally symmetrical, i.e., have the same size and spatial volume. As a result, if one of the light collection regions is sized to read only one side of a product, then another of the light collection regions, that is tasked to read two sides of the product, would not be large enough to reliably perform its task if both light collection regions had the same size. It would be desirable if different light collection regions had different sizes to perform different tasks. In addition, such light collection regions are twisted or skewed relative to the windows through which they pass. As a result, a peripheral portion of the twisted light collection region is clipped and blocked by a workstation wall bounding the window. All these factors, of course, degrade reading performance and efficiency.

SUMMARY OF THE INVENTION

This invention relates to a point-of-transaction workstation for electro-optically imaging indicia associated with multi-sided products. The indicia are preferably bar code symbols that are electro-optically read in order to identify products being purchased at the workstation. In a preferred embodiment, the workstation is a bi-optical or dual window workstation having a generally horizontal window supported by a housing and located in a generally horizontal plane, and an upright window, also supported by the housing, and located in a generally upright plane that intersects the generally horizontal plane. The upright plane may lie in a vertical plane, or be slightly rearwardly or forwardly inclined relative to the vertical plane. The products are passed by an operator or a customer through a scan zone, which occupies the space at and above the horizontal window, and also occupies the space at and in front of the upright window.

At least one solid-state imager, and preferably two solid-state imagers, one for each window, are supported by the housing. Each imager has a sensor array of sensors with a field of view. Each imager preferably comprises a two-dimensional, charge coupled device (CCD) array, or a complementary metal oxide semiconductor (CMOS) array, of sensors of megapixel size, e.g., 1280 pixels wide×960 pixels high. Each imager includes an imaging lens assembly for capturing return light from the indicia and for projecting the captured return light onto the sensor array. Each imager may include, or be associated with, an illuminator for illuminating the indicia with illumination light from illumination light sources, e.g., light emitting diodes (LEDs).

A controller or programmed microprocessor is operative for controlling each illuminator to illuminate the indicia, for controlling each imager to capture the illumination light returning from the indicia over an exposure time period or frame to produce electrical signals indicative of the indicia being read, and for processing the electrical signals to read the indicia, and to decode the indicia if the indicia is a symbol. Each illuminator is preferably only operative during the exposure time period. Each imager is controlled to capture the return light from the indicia during different exposure time periods to avoid interference between the illuminators.

In accordance with one aspect of this invention, an optical system is supported by the housing and is operative for asymmetrically splitting the field of view of at least one of the imagers, e.g., the imager for the horizontal window, into at least one smaller light collection region, and preferably two smaller light collection regions, in each of which return light from the indicia is captured by the horizontal imager through the horizontal window from one side of the product, and into at least another larger light collection region, and preferably two larger light collection regions, in each of which return light from the indicia is captured by the horizontal imager through the horizontal window from more than one side of the product. Each larger light collection region has a greater spatial volume than each smaller light collection region. Thus, one larger light collection region is advantageously customized to read the left side and the bottom of the product; another larger light collection region is customized to read the right side and the bottom of the product; and each smaller light collection region is customized to read the front of the product.

The optical system advantageously includes an optical splitter above the horizontal imager for splitting the field of view into a pair of first subfields of view in a first split. The optical splitter is preferably a triangular mirrored wedge having one reflecting surface above one portion, e.g., half, of the sensor array, and another reflecting surface above another portion, e.g., the other half, of the sensor array. In the case of the megapixel sensor array described above, each half is 1280 pixels wide×480 pixels high. The optical system further includes two pairs of fold mirrors, each pair of fold minors being positioned in a respective first subfield of view for splitting the respective first subfield of view into a pair of second subfields of view in a second split. The optical system still further includes two additional pairs of fold mirrors, each additional pair of fold minors being positioned in a respective second subfield of view for reflecting the respective second subfield of view as the asymmetrical light collection regions through the horizontal window.

Thus, the optical system twice splits the field of view of the horizontal imager as a result of said first and second splits into two of the smaller light collection regions and two of the larger light collection regions. All four of the light collection regions pass through the horizontal window along different intersecting directions to cover four sides of the product. The smaller and the larger light collection regions are appropriately sized to perform their different tasks. All four of the light collection regions are derived from just one imager, thereby significantly reducing workstation costs. All four of these light collection regions, together with the additional light collection region or regions described below that pass through the upright window, substantially fully occupy the scan zone. As a result, any dead areas in the scan zone in which indicia cannot be read are significantly minimized.

As mentioned above, the known light collection regions of the prior art are twisted or skewed relative to the windows through which they pass. As a result, peripheral portions of each twisted light collection region are clipped and blocked by workstation walls bounding the windows. To minimize, if not substantially eliminate, such clipping, the reflecting surfaces of the aforementioned optical splitter is specifically configured to lie in planes that diverge apart in order to at least partially, if not predominantly, rotate the first subfields of view so that the light collection regions pass through the horizontal window at a distance from, and generally parallel to, linear edges of each window. Thus, more of the light collection regions pass through, and more fully fit, each window.

The workstation further comprises a printed circuit board on which the arrays of both imagers are commonly mounted. The arrays of both imagers preferably extend along mutually perpendicular directions. Interface connectors for both imagers are preferably located at a same common edge of the printed circuit board for improved serviceability.

As for the sensor array of the vertical imager for the upright window, the entire, unsplit field of view may be reflected by a tilted reflector above the vertical imager, or a plurality of tilted reflectors may be arranged above the vertical imager for asymmetrically splitting the field of view of the sensor array of the vertical imager through the upright window as a plurality of the above-mentioned additional light collection regions, in which the back and top of the product are covered. Thus, indicia on the fifth and the sixth side of the product are read.

By way of numerical example, the generally horizontal window in a conventional bi-optical workstation measures about four inches in width by about six inches in length, and the generally upright window measures about six inches in width by about eight inches in length. The field of view of an imager capturing illumination light from the imager through a respective window does not inherently have these dimensions at the respective window and, hence, the light collection regions must be sized so that they match the dimensions of the respective window at the respective window, thereby enabling indicia to be reliably read when located anywhere in the scan zone at the respective window, as well as within a range of working distances therefrom.

In accordance with another feature of this invention, a method of electro-optically imaging indicia associated with multi-sided products passing through a point-of-transaction workstation, is performed by supporting at least one window by the workstation, capturing return light from the indicia through the at least one window over a field of view of a sensor array of sensors of a solid-state imager supported by the workstation, asymmetrically splitting the field of view of the imager into at least one light collection region in which the return light from the indicia is captured by the imager through the at least one window from one side of the product, and into at least another light collection region in which the return light from the indicia is captured by the imager through the at least one window from more than one side of the product, configuring the other light collection region to have a greater spatial volume than the one light collection region, and controlling the imager and processing the captured return light in at least one of the light collection regions.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
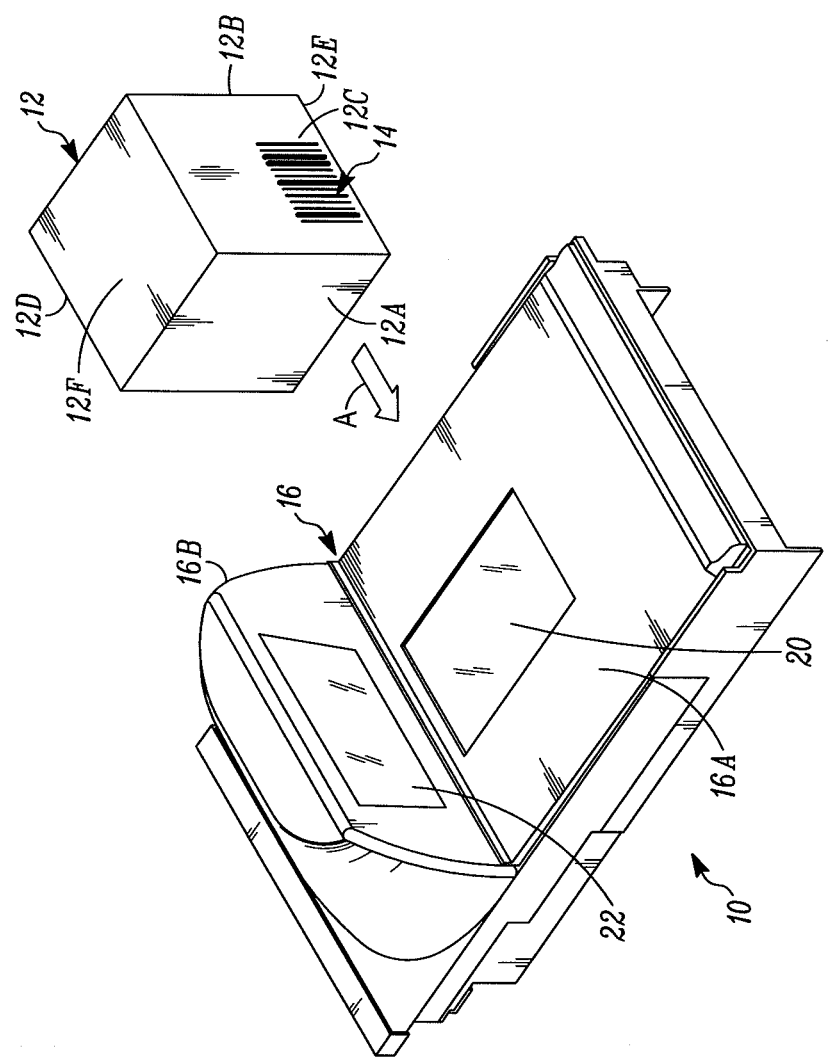
FIG. 1 is a perspective view of a dual window, bi-optical, point-of-transaction workstation or imaging reader operative for reading indicia on a multi-sided product passing through the workstation by image capture in accordance with this invention.

FIG. 1 depicts a dual window, bi-optical, point-of-transaction workstation 10 for electro-optically imaging indicia 14 or targets, such as the illustrated UPC symbol described above, associated with multi-sided, three-dimensional products 12, and is typically used by retailers to process transactions involving the purchase of the products 12 bearing, or printed with, the identifying indicia 14. The workstation 10 includes a housing 16 having a generally horizontal window 20 located in a generally horizontal plane and supported by a horizontal housing portion 16A, and an upright window 22 located in a generally upright plane that intersects the generally horizontal plane and supported by a raised housing portion 16B. The upright plane may lie in a vertical plane, or be slightly rearwardly or forwardly inclined relative to the vertical plane. The upright window 22 is preferably recessed within its housing portion 16B to resist scratching. The products are passed by an operator or a customer through a scan zone, which occupies the space at and above the horizontal window 20, and also occupies the space at and in front of the upright window 22.

The indicia 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The indicia 14 could also be a non-symbol target, such as a personal check, a credit card, a debit card, a signature, a driver's license, the consumer himself or herself, or the operator himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes. Thus, it can be determined if the operator is actually scanning the products, or passing them around the windows in an effort to bypass the windows and not charge the customer in a criminal practice known in retailing as "sweethearting".

The product 12 need not be a three-dimensional box as illustrated, but can be any object having a left side 12A, a right side 12B, a front side 12C, a rear side 12D, a bottom side 12E, and a top side 12F. The product 12 is slid or moved by an operator or a customer across and past the windows 20, 22 in the direction of the arrow A through the scan zone, or is presented to a central region of either window. As described above, the product 12 can be tilted or moved in other directions through the workstation 10.

Figure 2:
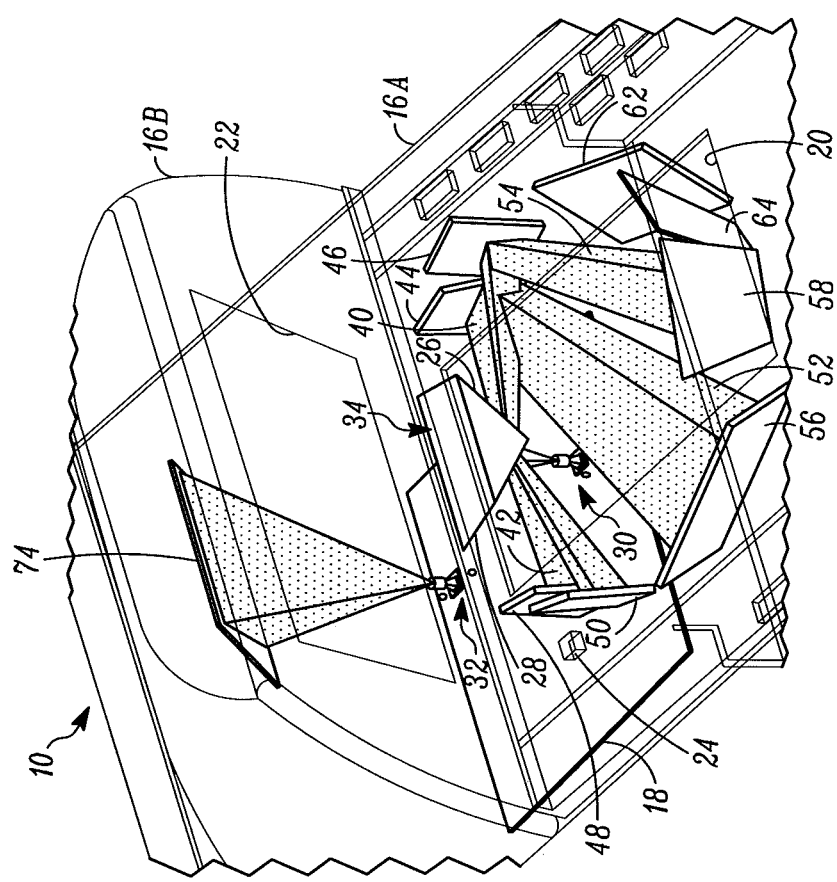
FIG. 2 is a broken-away, perspective view of an optical system in accordance with one embodiment of this invention in the workstation of FIG. 1 diagrammatically depicting a double split of the field of view of one of the imagers.
Figure 3:
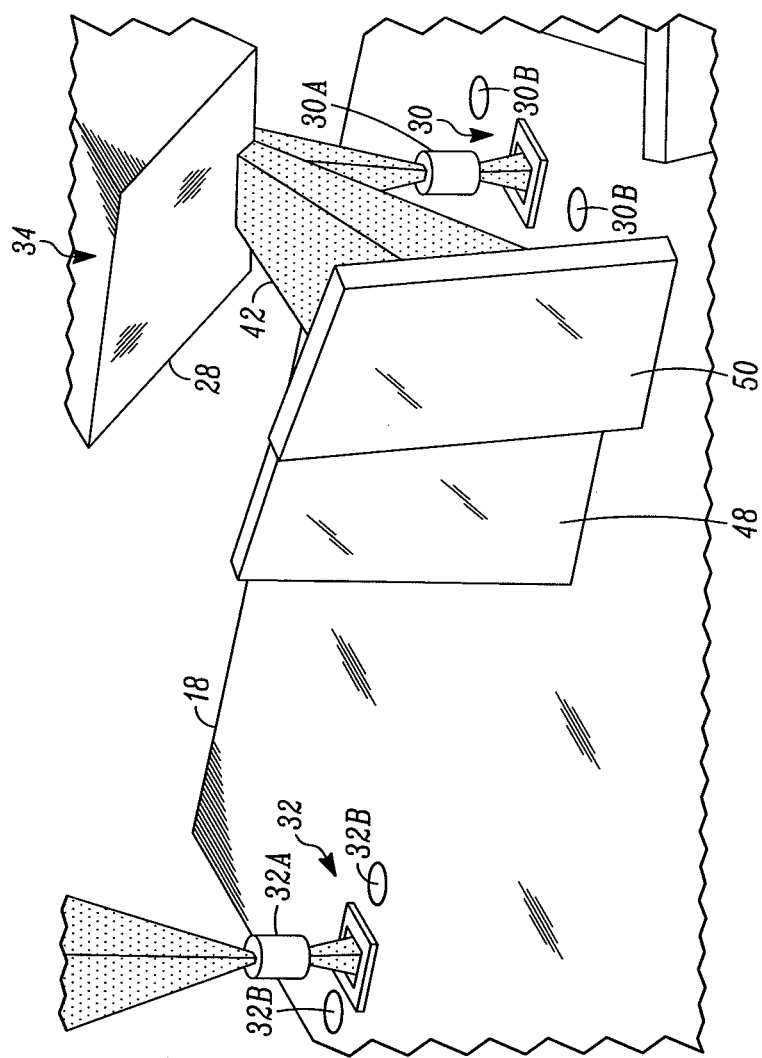
FIG. 3 is a perspective, enlarged, close-up view of a detail of FIG. 2.

As best shown in FIGS. 2-3, a first solid-state imager 30 and a second solid-state imager 32 are commonly supported on a printed circuit board 18 within the housing. Each imager 30, 32 has a sensor array of sensors with a field of view diagrammatically shown by dashed lines. As described below, the field of view of the first imager 30 is directed out of the horizontal window 20; hence, the first imager 30 will be individually referred to as the horizontal imager 30 for convenience. Similarly, the field of view of the second imager 32 is directed out of the upright window 22; hence, the second imager 32 will be individually referred to as the vertical imager 32 for convenience.

Each imager 30, 32 preferably comprises a two-dimensional, charge coupled device (CCD) array, or a complementary metal oxide semiconductor (CMOS) array, of sensors of megapixel size, e.g., 1280 pixels wide×960 pixels high. In a preferred embodiment, the field of view of the horizontal imager 30 measures about 15.2 degrees by 22.2 degrees; and the field of view of the vertical imager 32 measures about 22.5 degrees by 30.0 degrees. The arrays of both imagers 30, 32 extend along mutually perpendicular directions. Each imager 30, 32 includes an imaging lens assembly 30A, 32A for capturing return light from the indicia and for projecting the captured return light onto the respective sensor array. Each imager 30, 32 may include, or be associated with, an illuminator for illuminating the indicia with illumination light from one or more illumination light sources, e.g., surface-mounted, light emitting diodes (LEDs) 30B, 32B. The LEDs 30B, 32B may either be closely adjacent the respective sensor array, or remote therefrom, as described below.

A controller 24 is a programmed microprocessor that is also mounted on the board 18 and is operative for controlling each illuminator 30B, 32B to illuminate the indicia 14, for controlling each imager 30, 32 to detect the illumination light returning from the indicia and captured by the imaging lens assemblies 30A, 32A over an exposure time period or frame to produce electrical signals indicative of the indicia being read, and for processing the electrical signals to image the indicia 14, and to decode the indicia when the indicia is a symbol. Each illuminator 30B, 32B is preferably only operative during the exposure time period. Each imager 30, 32 is preferably controlled to capture the return light from the indicia during different exposure time periods to avoid interference between the illuminators 30B, 32B.

Each imager 30, 32 preferably has a global shutter so that the captured images will not be disturbed by motion of the indicia 14 relative to the window(s) during the exposure time period. A rolling or a mechanical shutter could also be employed. The indicia 14 can be presented or swiped at speeds up to around 100 inches per second across any part of either window. For an imager to be able to read an indicium that is moving rapidly, the indicium must be brightly illuminated by the illuminators 30B, 32B so that a short exposure time can be used. Bright illumination light shining out of either window can be annoying or uncomfortable to the user, so the illumination light must not be directly viewable by the operator, or by a consumer standing nearby. One aspect of this invention, as described below, is to protect the operator's or consumer's eyes from such bright illumination light.

In accordance with another aspect of this invention, an optical system is supported by the housing 14 and is operative for asymmetrically splitting the field of view of at least one of the imagers, e.g., the horizontal imager 30, into at least one smaller light collection region, and preferably two smaller light collection regions, in each of which return light from the indicia 14 is captured by the horizontal imager 30 through the horizontal window 20 from one side of the product 12, and into at least another larger light collection region, and preferably two larger light collection regions, in each of which return light from the indicia 14 is captured by the horizontal imager 30 through the horizontal window 20 from more than one side of the product 12. As described more fully below, each larger light collection region has a greater spatial volume than each smaller light collection region. Thus, one larger light collection region is advantageously customized to read the left side 12A and the bottom side 12E of the product 12; another larger light collection region is customized to read the right side 12B and the bottom side 12E of the product 12; and each smaller light collection region is customized to read the front side 12C of the product.

The optical system advantageously includes an optical splitter 34 located above the horizontal imager 30 for equally splitting the field of view into a pair of first, right and left, subfields of view 40, 42 in a first split. Each first subfield of view 40, 42 measures about 7.6 degrees by 22.2 degrees. The optical splitter 34 is preferably a triangular mirrored wedge having one reflecting surface 26 positioned above one portion, e.g., half, of the sensor array, and another reflecting surface 28 positioned above another portion, e.g., the other half, of the sensor array. In the case of the megapixel sensor array described above, each half is 1280 pixels wide×480 pixels high. As described below, the reflecting surfaces 26, 28 lie in diverging planes so that the upper surface of the optical splitter 34, as seen in top plan view, has a trapezoidal shape.

The optical system further includes a first pair of fold mirrors 44, 46 positioned in the first right subfield of view 40 for splitting the first right subfield of view 40 into a pair of second subfields of view 52, 54, as well as a second pair of fold minors 48, 50 positioned in the first left subfield of view 42 for splitting the first left subfield of view 42 into a pair of second subfields of view (not illustrated, but minor symmetrical to 52, 54) in a second split.

Figure 4:
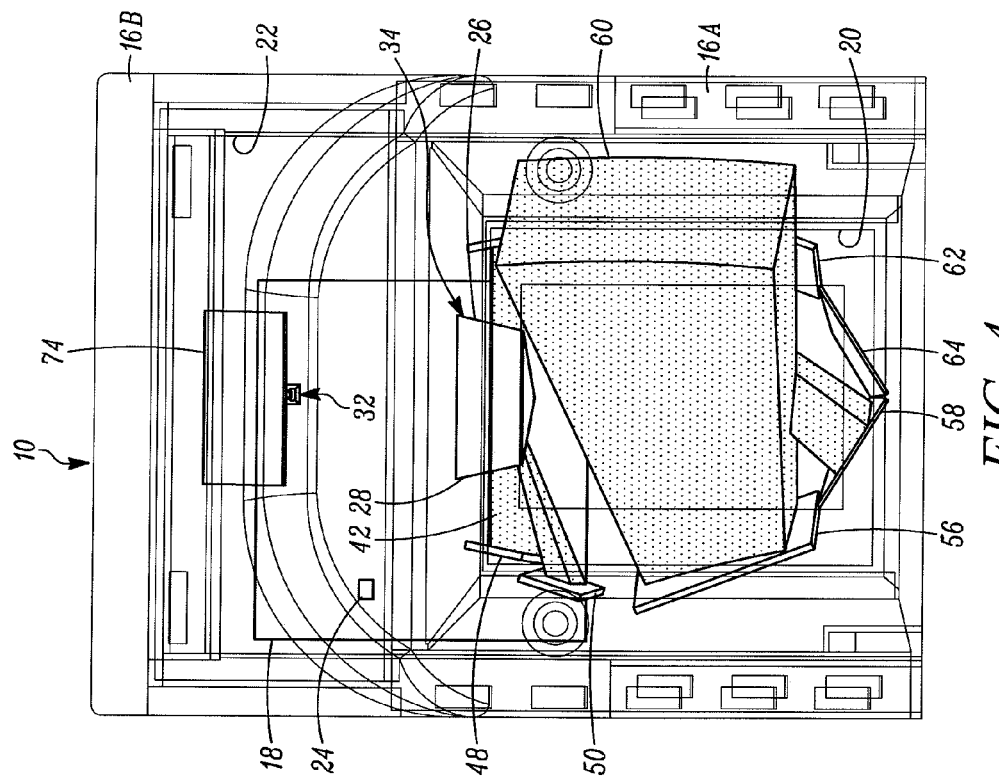
FIG. 4 is a top, perspective view of the optical system of FIG. 2 diagrammatically depicting a larger light collection region passing through a horizontal window.
Figure 5:
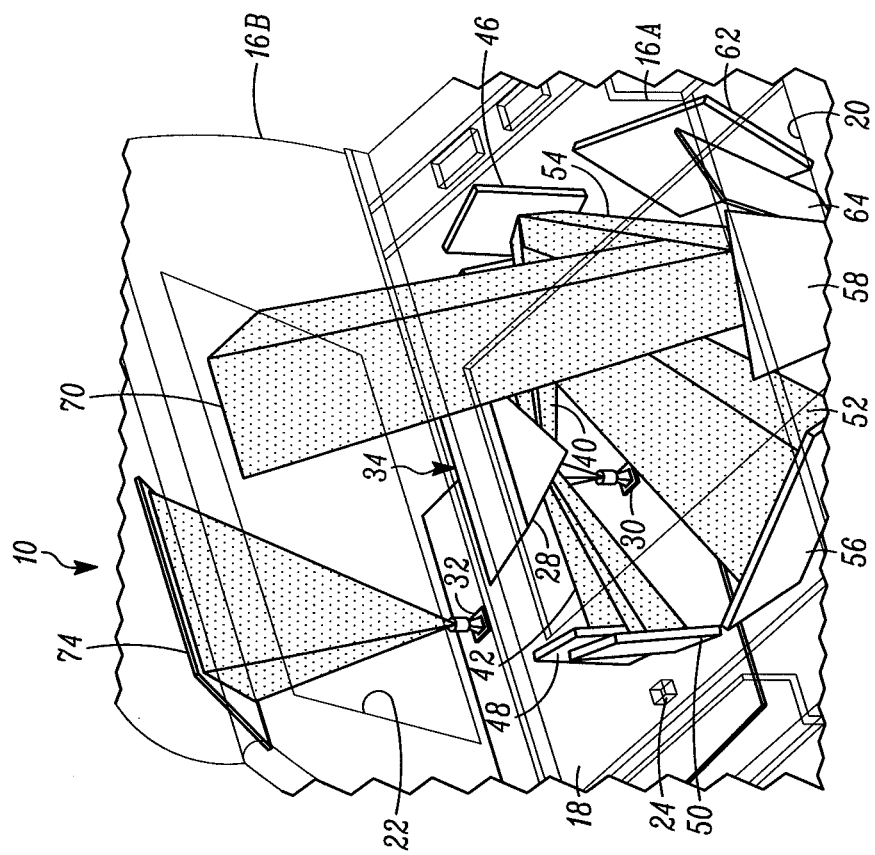
FIG. 5 is a top, perspective view of the optical system of FIG. 2 diagrammatically depicting a smaller light collection region passing through a horizontal window.

The optical system still further includes a first additional pair of fold minors 56, 58 respectively positioned in the second subfields of view 52, 54 for reflecting the second subfields of view 52, 54 as the aforementioned larger light collection region 60 (see FIG. 4) and the smaller light collection region 70 (see FIG. 5) through the horizontal window 20, as well as a second additional pair of fold mirrors 62, 64 respectively positioned in the second subfields of view for reflecting the second subfields of view as the aforementioned additional larger and smaller light collection regions (mirror symmetrical to 60 and 70 in FIGS. 4-5) through the horizontal window 20.

Thus, the optical system twice splits the field of view of the horizontal imager 30 as a result of said first and second splits into two of the smaller light collection regions 70, each measuring about 5.4 degrees by 7.6 degrees and two of the larger light collection regions 60, each measuring about 14.8 degrees by 7.6 degrees. All four of the light collection regions 60, 70 pass through the horizontal window 20 along different intersecting directions to read four sides of the product. All four of the light collection regions 60, 70 are derived from just the one horizontal imager 30, thereby significantly reducing workstation costs. The smaller and the larger light collection regions 70, 60 are appropriately sized to perform their different tasks. All four of the light collection regions 60, 70, together with the additional light collection region or regions described below that pass through the upright window 22, substantially fully occupy the scan zone. As a result, any dead areas in the scan zone in which indicia 14 cannot be read are significantly minimized.

Figure 6:
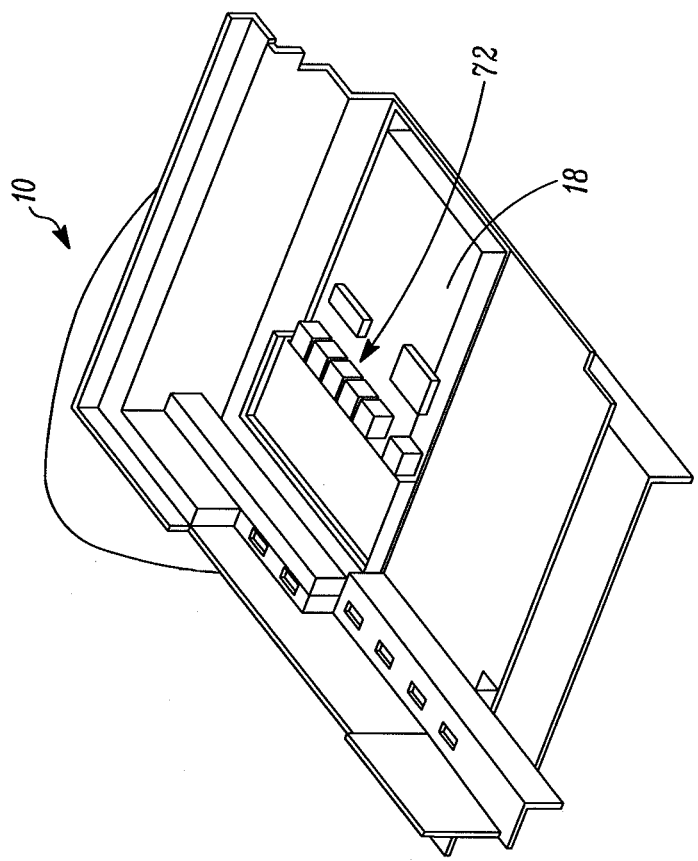
FIG. 6 is a bottom, perspective view of the workstation of FIG. 1.

A practical implementation of the bi-optical workstation 10 is shown in FIG. 6. All the electrical components are commonly mounted on the printed circuit board 18 for joint installation at, and joint removal from, the workstation 10 for ease of serviceability. Interface connectors 72 for both imagers 30, 32 are preferably located at a same common edge of the printed circuit board 18, again for improved serviceability and ease of assembly.

Figure 7:
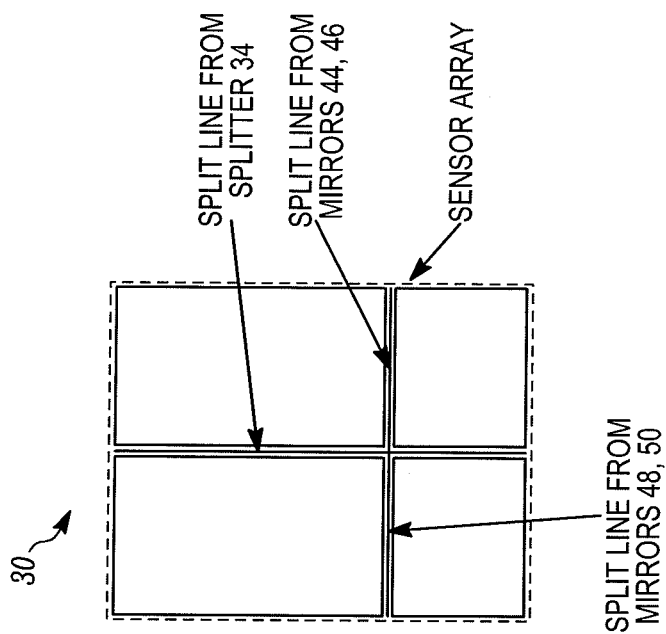
FIG. 7 is a diagrammatic top plan view of the sensor array of the horizontal imager of FIG. 2.

FIG. 7 diagrammatically depicts how the active area of the sensor array of the horizontal imager 30 is split by the optical system. The optical splitter 34 creates the vertical split line. The fold minors 44, 46 create the right horizontal split line. The fold mirrors 48, 50 create the left horizontal split line. The array is vertically elongated in FIG. 7.

As for the sensor array of the vertical imager 32 for the upright window 22, the entire, unsplit field of view measuring about 22.5 degrees by 30.0 degrees may be reflected by a single tilted reflector 74 (see FIGS. 2, 4, 5) above the vertical imager 30 toward and through the upright window 22, thereby covering the rear side 12D of the product 12 in a five-sided reading embodiment. The reflector 74 is tilted at an angle of about 45 degrees.

Figure 9:
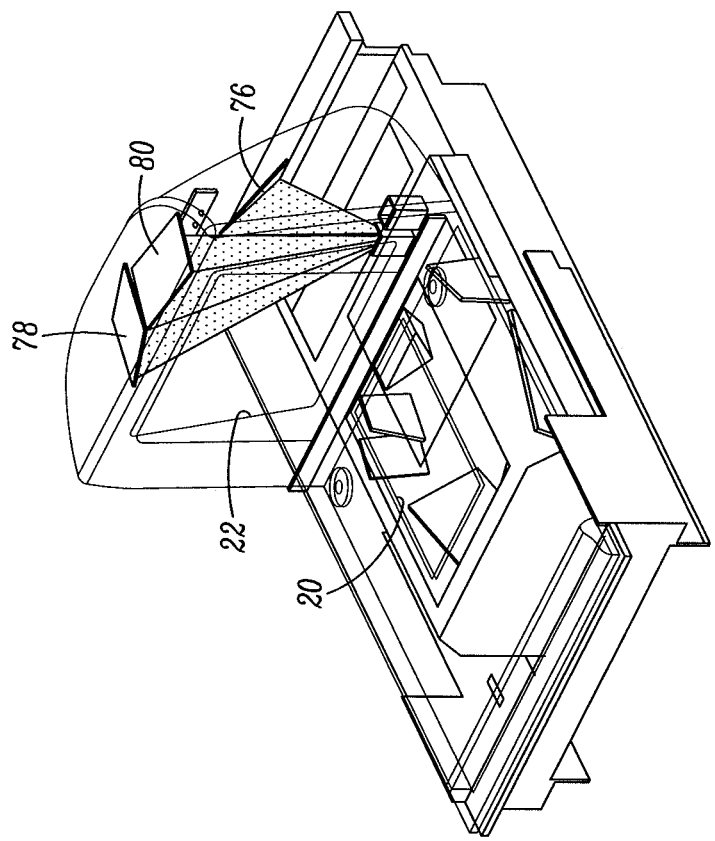
FIG. 9 is a perspective view of an optical system in accordance with another embodiment of this invention in the workstation of FIG. 1 diagrammatically depicting a split of the field of view of another of the imagers.

Alternatively, in a six-sided reading embodiment, as shown in FIG. 9, a plurality of tilted reflectors 76, 78, 80 is arranged above the vertical imager 32 for asymmetrically splitting the field of view of the sensor array of the vertical imager 32 through the upright window 22 as a plurality of additional light collection regions, in which the rear side 12D and the top side 12F of the product 12 are imaged. For the six-sided embodiment, it is desirable to increase the number of pixels in the vertical imager 32, e.g., to two megapixels, by using an array measuring 1600 pixels by 1200 pixels.

Figure 8:
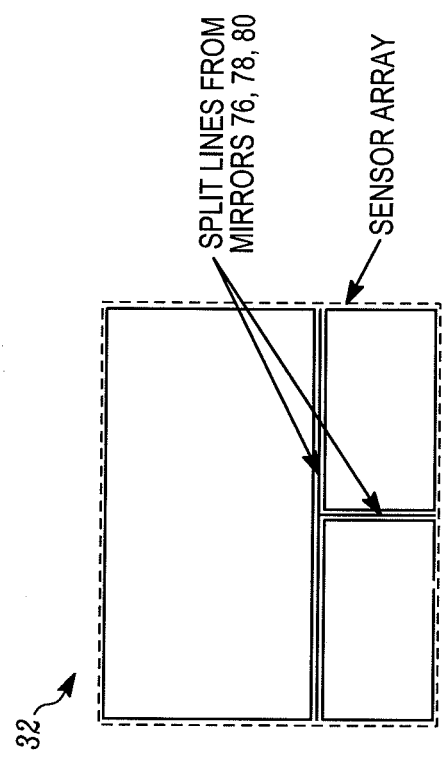
FIG. 8 is a view similar to FIG. 7 of the sensor array of the vertical imager of FIG. 2.

FIG. 8 diagrammatically depicts how the active area of the sensor array of the vertical imager 32 is split by the optical system. The reflectors 76, 78, 80 create the illustrated horizontal and vertical split lines. The array of the vertical imager 32 is horizontally elongated in FIG. 8 and, thus, as previously described, is perpendicular to the array of the horizontal imager 30 of FIG. 7.

In use, an operator, such as a person working at a supermarket checkout counter, or a customer in a self checkout stand, processes the product 12 bearing the UPC symbol 14 thereon, past the windows 20, 22 by swiping the product 12 across a respective window, or by presenting the product 12 at the respective window. The symbol 14 may located on any of the top, bottom, right, left, front and rear, sides of the product 12, and at least one, or perhaps both, of the imagers 30, 32 will capture the illumination light reflected, scattered, or otherwise returning from the symbol 14 through one or both windows 20, 22.

The embodiment shown in FIG. 9 is for a six-sided reader. Six-sided reading is most commonly used in supermarkets. Department stores and mass merchandisers, however, often use bi-optical readers, but do not need a six-sided scanning capability. A less expensive imaging bi-optical reader, e.g., a five-sided reader, as shown in FIGS. 2-5, is thus useful for department stores and mass merchandisers. The part of the optical system in the horizontal housing portion 16A is the same for both the five-sided and the six-sided reader, thereby simplifying conversion between the two readers by a manufacturer by simply changing the vertical housing portion 16B with its interior optics.

By way of numerical example, the generally horizontal window 20 in a conventional bi-optical workstation 10 measures about four inches in width by about six inches in length, and the generally upright window 22 measures about six inches in width by about eight inches in length. The fields of view of the imagers capturing return light from the imagers through the windows do not inherently have these dimensions at the windows and, hence, the light collection regions must be sized, positioned and configured so that they match the dimensions of the respective window at the respective window, thereby enabling the indicia 14 to be reliably read when located anywhere in the scan zone at the respective window, as well as within a range of working distances therefrom.

Figure 10:
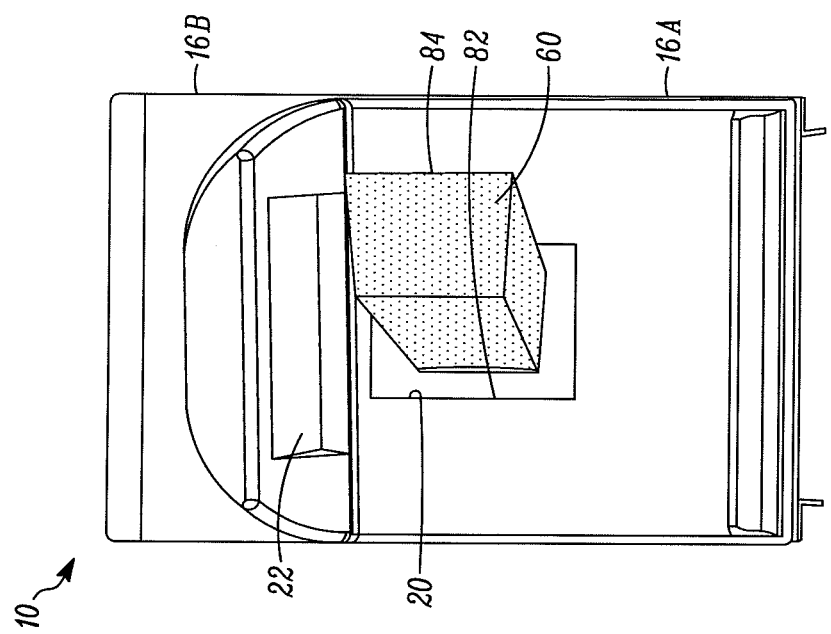
FIG. 10 is a top, perspective view diagrammatically depicting a representative light collection region relative to a horizontal window of the workstation of FIG. 1.

As mentioned above, the known light collection regions of the prior art are twisted or skewed relative to the windows through which they pass. As a result, peripheral portions of each twisted light collection region are clipped and blocked by workstation walls bounding the windows. To minimize, if not substantially eliminate, such clipping, the reflecting surfaces 26, 28 of the aforementioned optical splitter 34 are specifically configured to lie in planes that diverge apart in order to at least partially rotate the first subfields of view 40, 42 so that the light collection regions 60, 70 pass through the horizontal window 20 at a distance from, and generally parallel to, linear edges 82 (see FIG. 10) of each window. The reflecting surfaces 26, 28 are predominantly responsible for such rotation, and they are aided by the arrangement and positioning of the fold minors 44, 46, 56, 58, and 48, 50, 62, 64. Thus, as shown in FIG. 10, representative light collection region 60 fits within the window 20 and its peripheral portion 84 is spaced from the linear edge 82. Thus, more of the light collection regions pass through, and more fully fit, the window 20. This allows the shape of the fields of view to better fill the windows without being partially blocked by the edges of the windows.

As noted above, each imager 30, 32 in FIG. 3 has a set of LEDs 30B, 32B adjacent the respective sensor arrays for illuminating the indicia. The LED illumination systems include lenses (not shown) that concentrate the LED illumination light of each illuminator into a solid angle or illumination field that approximately matches the field of view of each imager. The illumination light for each imager is reflected off of the same reflecting surfaces and minors as the field of view of its associated imager. Thus, the illumination fields substantially match, and occupy the same space as, the light collection regions 60, 70. Just as the light collection regions 60, 70 are deliberately angled away from the upright window 22, so too are the illumination fields directed off to the sides of the workstation so as to keep annoying reflections off the upright window away from the eyes of the user.

Figure 11:
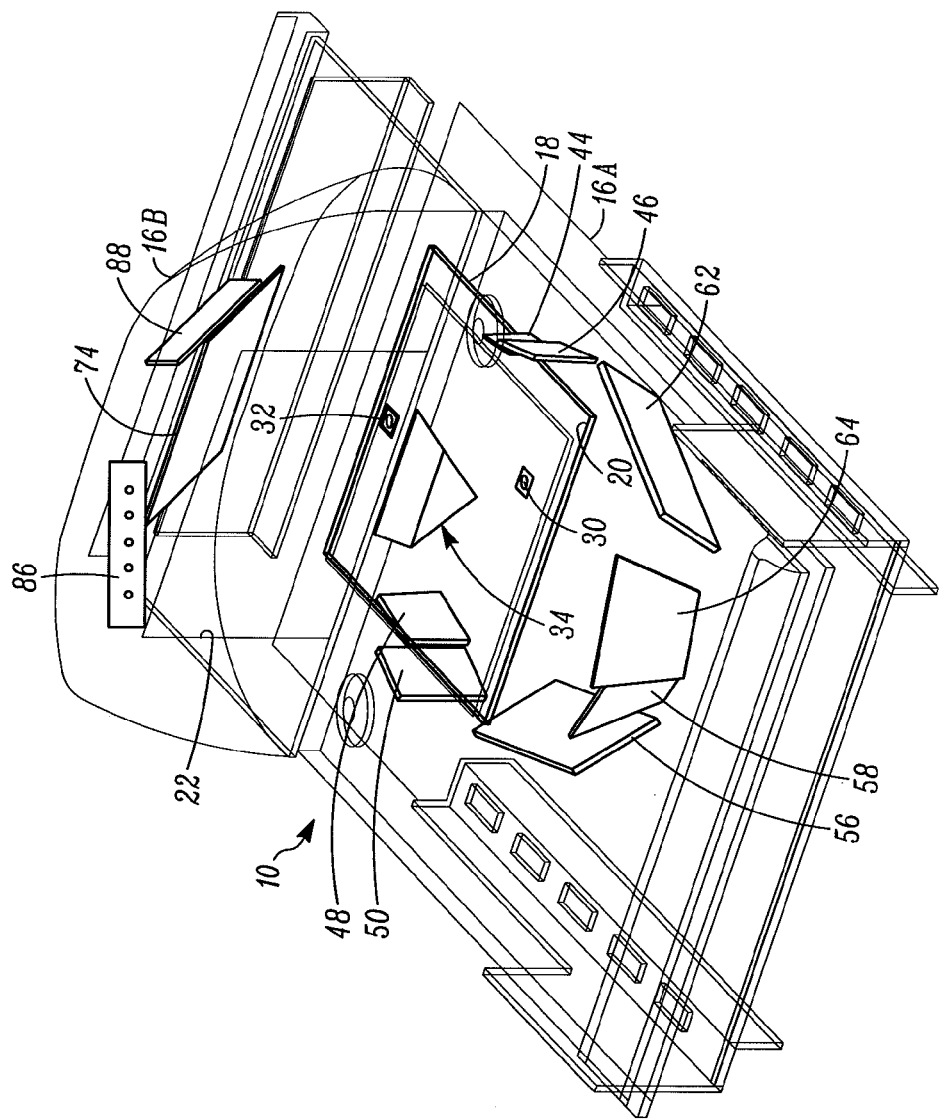
FIG. 11 is a side, perspective view of the workstation of FIG. 1 showing a different placement for the illuminators for illuminating the indicia to be read.
Figure 12:
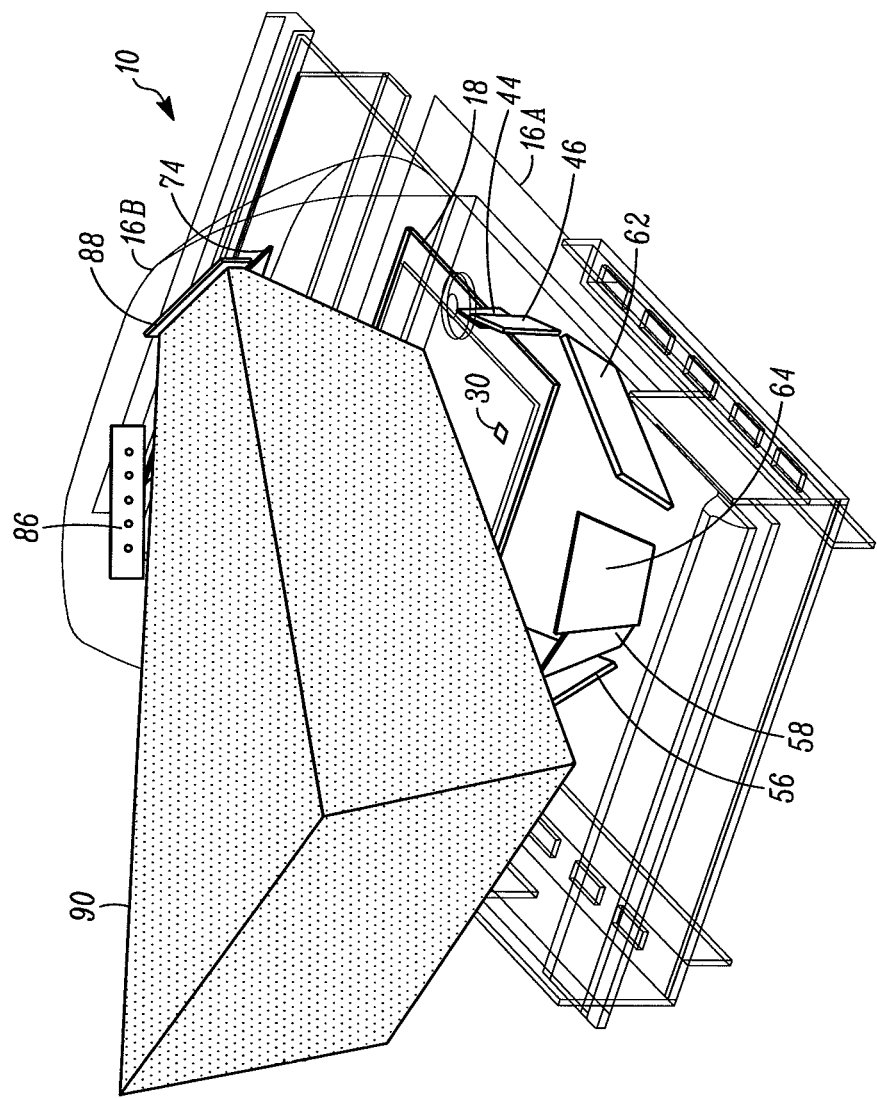
FIG. 12 is a view analogous to FIG. 11 diagrammatically showing the illumination field of one of the illuminators.

Similarly, as shown in FIGS. 11-12, the illumination fields in the light collection region passing through the upright window 22 are angled down so that any reflections off the horizontal window are directed away from the eyes of the user. In FIGS. 11-12, rather than locating the illumination LEDs 30B, 32B adjacent the sensor array of the imager 32, the illumination light sources are located remotely from the imager 32. For example, two rows of multiple illumination LEDs are respectively mounted on printed circuit boards 86, 88, which are located within the raised housing portion 16B at an elevation above the upright window 22 at opposite sides of the minor 74. Each row of the illumination LEDs produces a more diffuse, less intense, spread-out distribution of the illumination light, as compared, for example, to the illumination LEDs 30B, 32B, which act as point sources. The board 88 is downwardly and forwardly tilted to direct the illumination field 90 for the board 88 as shown in FIG. 12 away from one's eyes. The board 86 is likewise downwardly and forwardly tilted to direct an illumination field that is mirror symmetrical to the illumination field 90. The use of remote boards with rows of multiple illumination LEDs could also be used for the horizontal imager 30 by positioning such boards underneath the horizontal window 20 at right and left sides of the board 18.

It will be understood that each of the elements described above, or two or more together, also may find a useful application in other types of constructions differing from the types described above.

While the invention has been illustrated and described as embodied in a point-of transaction workstation for electro-optically reading indicia by using two imagers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A point-of-transaction workstation for electro-optically imaging indicia associated with multi-sided products, comprising:
   a housing;
   a window supported by the housing;
   a solid-state imager supported by the housing and having a two-dimensional array of sensors with a field of view;
   an optical system supported by the housing and operative for asymmetrically splitting the field of view of the imager into at least one light collection region in which return light from the indicia is captured by the imager through the window from one side of the product, and into at least another light collection region in which return light from the indicia is captured by the imager through the window from more than one side of the product, the other light collection region having a greater spatial volume than the one light collection region;
   a controller for controlling the imager and for processing the captured return light in at least one of the light collection regions;
   wherein the window is located in a generally horizontal plane; wherein the sensor array faces upwardly toward the generally horizontal plane; wherein the optical system includes an optical splitter above the imager for splitting the field of view into a pair of first subfields of view in a first split; and wherein the optical splitter has one reflecting surface above one half of the sensor array, and another reflecting surface above the other half of the sensor array;
   wherein the optical system includes two pairs of fold mirrors, each pair of fold mirrors being positioned in a respective first subfield of view for splitting the respective first subfield of view into a pair of second subfields of view in a second split;
   wherein the optical system includes two additional pairs of fold mirrors, each additional pair of fold mirrors being positioned in a respective second subfield of view for reflecting the respective second subfield of view as the asymmetrical light collection regions through the window; and wherein the optical system twice splits the field of view of the imager as a result of said first and second splits into two of the one light collection region of substantially equal smaller spatial volume and two of the other light collection region of substantially equal greater spatial volume; and wherein all four of the light collection regions pass through the same window along different intersecting directions.

2. The workstation of claim 1, wherein the window is located in a generally horizontal plane, and further comprising another window located in a generally upright plane that intersects the generally horizontal plane.

3. The workstation of claim 2, and further comprising another solid-state imager supported by the housing and having a sensor array of sensors with a field of view for capturing return light from the indicia through the other window; and further comprising a printed circuit board on which the arrays of both imagers are commonly mounted.

4. The workstation of claim 3, wherein the arrays of both imagers extend along mutually perpendicular directions.

5. The workstation of claim 3, wherein the sensor array of the other imager faces upwardly toward the generally horizontal plane; and wherein the optical system includes a tilted reflector above the other imager for reflecting the entire field of view of the sensor array of the other imager through the other window.

6. The workstation of claim 3, wherein the sensor array of the other imager faces upwardly toward the generally horizontal plane; and wherein the optical system includes a plurality of tilted reflectors above the other imager for asymmetrically splitting the field of view of the sensor array of the other imager through the other window as a plurality of additional light collection regions.

7. The workstation of claim 1, wherein the window has linear edges; and wherein the reflecting surfaces of the optical splitter lie in planes that diverge apart to at least partially rotate the first subfields of view so that the light collection regions pass through the window at a distance from, and generally parallel to, the linear edges of the window.

8. A method of electro-optically imaging indicia associated with multi-sided products passing through a point-of-transaction workstation, comprising the steps of:
supporting a window by the workstation;
capturing return light from the indicia through the window over a field of view of a two-dimensional array of sensors in a solid-state imager supported by the workstation;
asymmetrically splitting the field of view of the imager into at least one light collection region in which the return light from the indicia is captured by the imager through the window from one side of the product, and into at least another light collection region in which the return light from the indicia is captured by the imager through the window from more than one side of the product;
configuring the other light collection region to have a greater spatial volume than the one light collection region;
controlling the imager and processing the captured return light in at least one of the light collection regions;
wherein the splitting step is performed by splitting the field of view into a pair of first subfields of view in a first split, and by positioning each pair of two pairs of fold mirrors in a respective first subfield of view for splitting the respective first subfield of view into a pair of second subfields of view in a second split;
wherein the splitting step is performed by positioning each pair of two additional pairs of fold mirrors in a respective second subfield of view for reflecting the respective second subfield of view as the asymmetrical light collection regions through the window; and
wherein the splitting step is performed twice to split the field of view of the imager into two of the one light collection region of substantially equal smaller spatial volume and two of the other light collection region of substantially equal greater spatial volume; and wherein all four of the light collection regions pass through the same window along different intersecting directions.

9. The method of claim 8, and configuring the window with linear edges; and rotating the first subfields of view so that the light collection regions pass through the window at a distance from, and generally parallel to, the linear edges of the window.

10. The method of claim 9, and further comprising the step of capturing return light from the indicia through another window over a field of view of another sensor array of sensors of another solid-state imager supported by the housing; and orienting the arrays of both imagers to extend along mutually perpendicular directions.

11. The method of claim 10, and the step of reflecting the entire field of view of the sensor array of the other imager through the other window.

12. The method of claim 10, and the step of asymmetrically splitting the field of view of the sensor array of the other imager through the other window as a plurality of additional light collection regions.

* * * * *